Sept. 2, 1941.    G. L. KNOX    2,254,532
CONVERSION DOLLY FOR SEMITRAILERS
Filed Feb. 17, 1941

Inventor
Garner L. Knox.

Attorneys.

Patented Sept. 2, 1941

2,254,532

UNITED STATES PATENT OFFICE 2,254,532

CONVERSION DOLLY FOR SEMITRAILERS

Garner L. Knox, Glendale, Calif., assignor to Utility Trailer Manufacturing Company, Los Angeles, Calif., a corporation of California Application February 17, 1941, Serial No. 379,237

6 Claims. (Cl. 280—33.4)

In transportation systems of the tractor-and-semi-trailer type it is desirable to provide two-wheeled dollies for the conversion of semi-trailers into vehicles of the four wheeled type—otherwise known as full trailers. The advantageous uses to which a trailer may be adapted by such conversion are well understood and need not be enlarged upon here. The present invention relates to such conversion dollies and provides an improved type of dolly which better performs the requisite functions, has a structure of greatest simplicity, and requires no manual operations or adjustments to enable it to perform its functions. In the latter regard it may be called a fully automatic dolly.

The improvements which constitute the invention will best be understood from the following discussion, and detailed description of a preferred and illustrative form shown in the accompanying drawing, in which.

Figure 1:
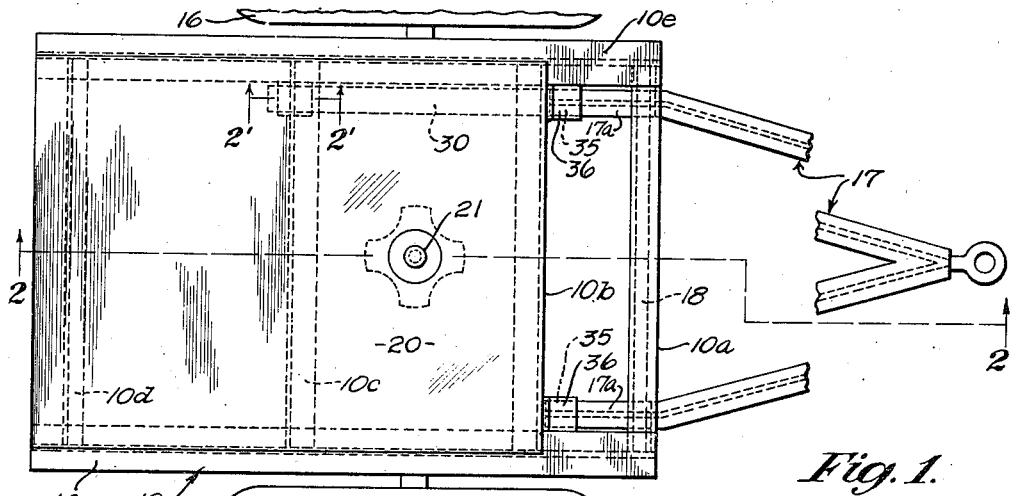
Fig. 1 is a plan of the illustrative dolly.
Figure 2:
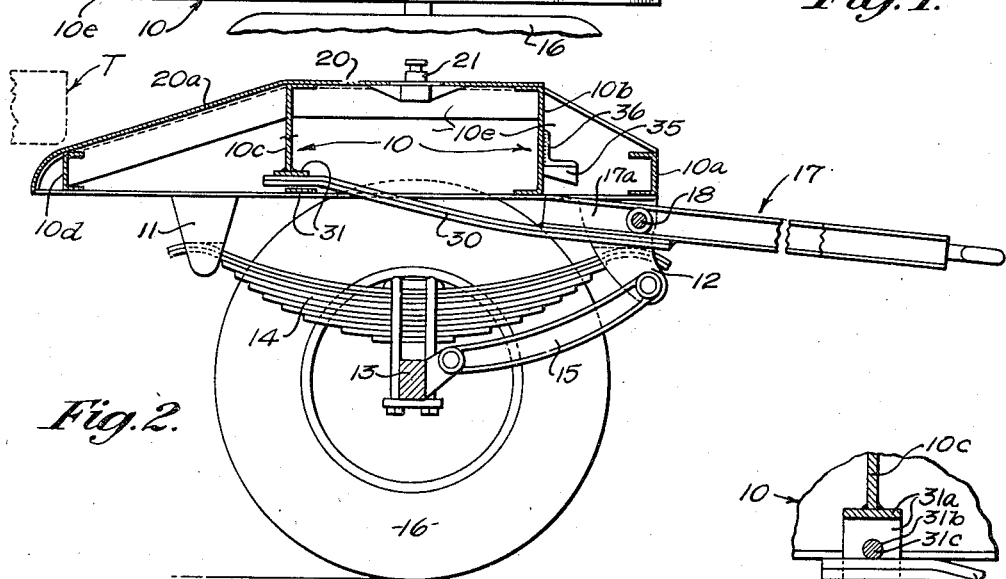
Fig. 2 is a longitudinal vertical section showing the parts in normal condition, illustrative of the condition when the dolly is carrying the semi-trailer or when the dolly is being towed by itself.
Figure 3:
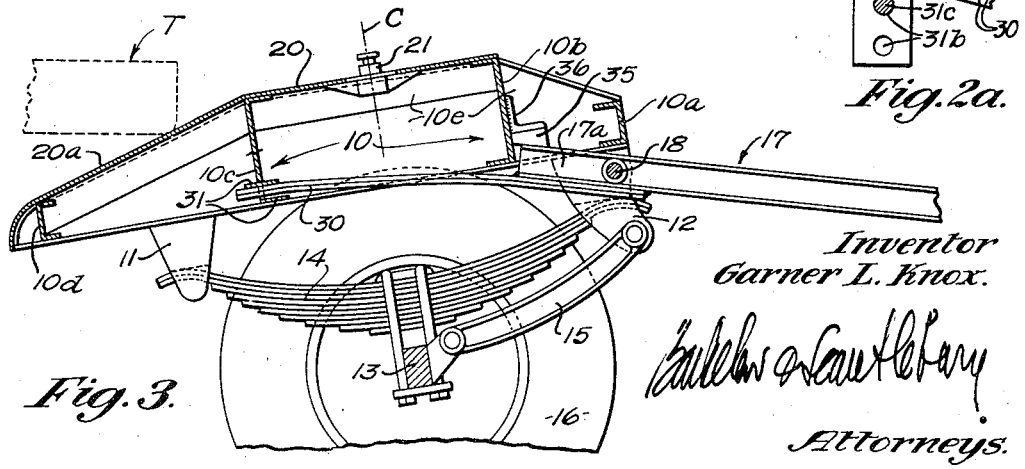

Fig. 3 is a similar view showing the dolly in the position assumed when picking up or dropping the semi-trailer. Figs. 2 and 3 are taken mainly on line 2—2 of Fig. 1, but with a fragmentary portion of the section taken on line 2'—2' of that figure.

In the drawing the dolly frame, which may be of any suitable structure, is indicated at 10. As here shown, the frame includes cross-beams 10a, 10b, 10c and 10d, united by longitudinals 10e. Spring engaging brackets 11 and 12 depend from longitudinals 10e, so that the dolly frame is supported on axle 13 through springs 14. A pair of radius bars 15 restrains longitudinal movement of the dolly frame with reference to the axle. The axle has two wheels 16. A draw-bar tongue 17 is pivotally connected with the dolly frame at the horizontal pivot 18.

A lower fifth wheel or saddle plate 20 is mounted on or incorporated into the frame structure and has a sloping rearward extension 20a. The fifth wheel plate 20 is typically centered over axle 13, is substantially horizontal when in its normal position such as indicated in Fig. 2, and carries a central coupling member such as the king-pin 21 here shown. It will be understood that the complementary coupling member and a complementary upper fifth wheel plate are carried by the forward end of the semi-trailer. Which one of the two complementary coupling members is carried on the dolly frame, is immaterial, as is also the particular nature of the couplings (e. g. whether automatic or not). Those particulars of my dolly will conform to whatever system of coupling that the trailer may be provided with for its cooperation directly with the towing tractor.

As is well understood, the forward end of the semi-trailer frame is supported by some kind of temporary support when the trailer is standing alone and uncoupled to a tractor or dolly. When thus standing, the trailer front stands normally at such a relative level as indicated at T in Figs. 2 and 3.

The general functions required of the dolly may be briefly summarized as follows.

The dolly is required to pick up the trailer by backing into and under it to a position where the upper fifth wheel of the trailer rides flatly on the fifth wheel plate of the dolly. In order to do that, the dolly frame must be stabilized in some manner so that its rear end cannot tip down beyond some certain limit. And further, it is desirable that the dolly shall be capable of picking up the trailer even though the relative level of the trailer vary quite widely from that indicated at T, which may result from ground unevennesses.

When the trailer is seated on the dolly a substantial amount of vertical flexibility must be allowed between the dolly frame and the tongue, to compensate for ground undulations, which may be considerable in many places where freight trailers are commonly operated.

When the dolly is being towed by itself its frame must have sufficient stability that it will not tend to tip over forward or rearward on its tilting axis—which is here shown as, but need not necessarily be, the center of the axle.

Previous attempts to provide the foregoing requirements have resulted in providing the rear end of the dolly frame with a movable temporary ground support which supports that end while the dolly is picking up or dropping the trailer; and in providing a means, such as a releasable link, which may be applied between the dolly frame and the draft tongue to interconnect those parts rigidly when the dolly is being towed by itself. Both those provisions add complications, and require manipulation to suit the several different conditions of dolly operation. On the contrary, the solution of the problem provided by my invention is relatively extremely simple, involves substantially no moving parts, requires no manipulation, and has the further advantage of allowing the dolly a wider range of effectiveness in picking up a trailer.

In accordance with my invention the pivoted tongue 17 is resiliently connected with the dolly frame in such manner that the relative pivotal movement between those two parts is resiliently restrained. And the relative movement which occurs between those parts when the rear end of the dolly frame tips downwardly under the trailer weight is limited by stops which act substantially positively.

Figure 2A:
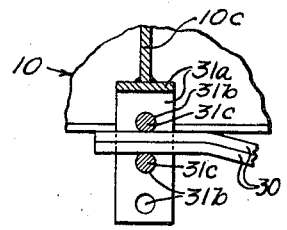
Fig. 2a is a fragmentary view showing a modification.

For instance, a leaf spring 30 is rigidly secured, as by welding, to one of the two rearward pivoted ends 17a of tongue 17. The spring extends rearwardly and its rear end is slidingly confined between plates or flanges 31 which are associated with cross beam 10c. The position of the rear end of the spring may be substantially fixed, as regards vertical movement; or it may be vertically adjustable so that the normal relative positions of the tongue and dolly frame may be adjusted to suit the height of the tongue's front end to different tractors. Fig. 2a illustrates an adjustable spring connection. Here the rear end of the spring 30 passes through an inverted stirrup 31a having a plurality of vertically spaced apertures 31b adapted to receive pins 31c. The spring end can then be selectively held at different heights by proper placement of the pins.

The strength of spring 30 is such that the dolly frame, when not loaded, will normally remain substantially upright over axle 13 when tongue 17 is substantially horizontal, or when the position of the tongue is fixed by its forward end being coupled to the towing tractor. If anything, it may be preferred to have the dolly frame normally tilted somewhat rearwardly when the tongue is so coupled, to position the rear end of sloping plate 20a low enough to insure its passing under the front end of a trailer. And in this connection I may mention that when the dolly is backed by rearward thrust on the tongue the tendency is to tip the dolly rearward from its normal position even before it contacts the trailer. And if the rear end of the dolly contacts the front end of the trailer without sloping surface 20a coming under the trailer, rearward thrust on the tongue which is on a line above the dolly axle, will tend to force the rear end of the dolly frame, and surface 20a, down to pass under the trailer.

When the trailer T is picked up the rear end 20a of the dolly frame invariably tilts down under the trailer weight, as spring 30 is chosen not to be of sufficient strength to support the lightest trailer, unloaded, with which the dolly is designed to cooperate. As the dolly is backed under the trailer the rear end of the dolly frame tilts down until the rear end 17a of the tongue, rearward of pivot 18, swings up (relatively) against a stop 35. The relative angle through which the dolly frame and tongue swing, from normal position to stopped position, may be varied somewhat widely; but in practice I find that, using a tongue about five feet long, an angle such as shown in the drawing (compare Figs. 2 and 3) is sufficient for practical purposes—an angle of about 10°.

In the position of Fig. 3 the tongue, with its forward end affixed to the tractor, prevents further backward tipping of the dolly frame by contact with stop 35. Further backing of the dolly then backs the sloping plate 20a under the trailer at the angle illustrated. Because pivot 18 and the line of thrust through the tongue are above axle 13, the thrust reaction tends to bear the tongue end solidly against stop 35 and the tongue and dolly frame act as a rigid unit while the trailer is being raised and until the point of support of the trailer weight passes forward of the center line C. At that time the dolly frame straightens up under the lower fifth wheel plate of the trailer, into such a position as shown in Fig. 2.

The dolly is then backed under further until the trailer fifth wheel (which may be nothing more than the lower surface of the trailer frame) rests in proper position on fifth wheel 20 and the coupling is locked. The weight of the trailer bearing on the flat surface of 20, or the fact that the coupling engages under a head 21a on the king pin (or both circumstances), then prevents the dolly frame from tipping relative to the trailer frame while the trailer is being towed. Relative changes in angular position between the plane of the trailer and dolly frame and the plane of the tongue are then fully allowed by spring 30. The angle of freedom allowed by stop 35 is, and must be, sufficient to allow free angular play in a vertical plane to the maximum amount which is induced by ground unevenness. The lengths of the tongue and of the trailer are also factors which enter into determination of the necessary minimum angle of freedom. Assuming an average trailer length (from its rear wheels to the dolly wheels), and a tongue length of five feet, the angular freedom of 10° is found to be sufficient for most ground variations over which such trailers are operated. This, however may be varied.

The stop structure as well as that of tongue 17 and spring 30 may be varied. I have shown a tongue of V-structure with two rear ends 17a pivotally mounted on a single pivot rod 18 which extends transversely between brackets 12. As no great stresses have to be exerted by spring 30, I show merely one attached to one of the tongue ends. However, because the stop 35 and the tongue have to take stresses commensurate with the weight of a loaded trailer, I prefer to make the stop double and engage both tongue ends 17a. It is also preferable that the stop action be somewhat soft. Accordingly I have shown two rubber block stops 35 mounted on the under faces of brackets 36 which are attached (e. g. welded) to cross beam 10b.

I claim:

1. In a dolly adapted to be used with a tractor and a semi-trailer which has an upper fifth wheel surface at its forward end, the dolly having a pair of ground wheels and an axle, a frame on the axle, a lower fifth wheel adapted to engage the trailer fifth wheel, and a tongue connectible with the tractor and connected with the dolly in such manner that the tongue and lower fifth wheel have relative swinging movement in a vertical plane; the improvement which comprises a resilient element yieldingly resisting the relative swinging movement between the tongue and the lower fifth wheel, said element yielding to allow the fifth wheel to tilt downwardly at the rear under the weight of the trailer, and stop means acting between the tongue and fifth wheel to limit the rearward tilt of the latter.

2. In a dolly adapted to be used with a tractor and a semi-trailer which has an upper fifth wheel surface at its forward end, the dolly having a pair of ground wheels and an axle, a frame on the axle, a lower fifth wheel adapted to engage the trailer fifth wheel, and a tongue connectible with the tractor and connected with the dolly in such a manner that the tongue and lower fifth wheel have relative swinging movement in a vertical plane; the improvement which comprises a resilient element yieldingly resisting the relative swinging movement between the tongue and the lower fifth wheel, said element yielding to allow the fifth wheel to tilt downwardly at the rear under the weight of the trailer, and stop means acting between the tongue and fifth wheel to limit the rearward tilt of the latter, the last mentioned means allowing sufficient angular freedom between the tongue and fifth wheel to accommodate angular movements induced by ground variations when the trailer is being towed on the dolly.

3. In a dolly adapted to be used with a tractor and a semi-trailer which has an upper fifth wheel surface at its forward end, the dolly having a pair of ground wheels and an axle, a frame mounted on the axle and carrying a lower fifth wheel adapted to engage the trailer fifth wheel, and a tongue connectible with the tractor and connected with the dolly frame on a horizontal pivot so that the dolly frame and pivot may have relative swinging movement in a vertical plane; the improvement which comprises a resilient element yieldingly resisting the relative swinging movement between the tongue and dolly frame, said element yielding to allow the dolly frame to tilt downwardly at its rear under the weight of the trailer, and stop means acting between the tongue and dolly frame to limit the rearward tilt of the latter.

4. In a dolly adapted to be used with a tractor and a semi-trailer which has an upper fifth wheel surface at its forward end, the dolly having a pair of ground wheels and an axle, a frame mounted on the axle and carrying a lower fifth wheel adapted to engage the trailer fifth wheel, and a tongue connectible with the tractor and connected with the dolly frame on a horizontal pivot so that the dolly frame and pivot may have relative swinging movement in a vertical plane; the improvement which comprises a resilient element yieldingly resisting the relative swinging movement between the tongue and dolly frame, said element yielding to allow the dolly frame to tilt downwardly at its rear under the weight of the trailer, and stop means acting between the tongue and dolly frame to limit the rearward tilt of the latter, the stop means allowing sufficient angular freedom between the tongue and dolly frame to accommodate angular movements induced by ground variations when the trailer is being towed on the dolly.

5. In a dolly adapted to be used with a tractor and a semi-trailer which has an upper fifth wheel surface at its forward end, the dolly having a pair of ground wheels and an axle, a frame mounted on the axle and carrying a lower fifth wheel adapted to engage the trailer fifth wheel, and a tongue connectible with the tractor and connected with the dolly frame on a horizontal pivot so that the dolly frame and pivot may have relative swinging movement in a vertical plane; the improvement which comprises a resilient element yieldingly holding the tongue and dolly frame in such relative position that the line of thrust through the tongue lies above the dolly axle, said resilient element yielding to allow the dolly frame to tilt downward at its rear when its rear end is backed against the trailer, and stop means acting between the tongue and dolly frame to limit the rearward tilt of the latter.

6. In a dolly adapted to be used with a tractor and a semi-trailer which has an upper fifth wheel surface at its forward end, the dolly having a pair of ground wheels and an axle, a frame mounted on the axle and carrying a lower fifth wheel adapted to engage the trailer fifth wheel, and a tongue connectible with the tractor and connected with the dolly frame on a horizontal pivot so that the dolly frame and pivot may have relative swinging movement in a vertical plane; the improvement which comprises a resilient element yieldingly holding the tongue and dolly frame in such relative position that the line of thrust through the tongue lies above the dolly axle, said resilient element yielding to allow the dolly frame to tilt downward at its rear when its rear end is backed against the trailer, and stop means acting between the tongue and dolly frame to limit the rearward tilt of the latter, the stop means allowing sufficient angular freedom between the tongue and dolly frame to accommodate angular movements induced by ground variations when the trailer is being towed on the dolly.

GARNER L. KNOX.